Dec. 30, 1958
C. M. SURBER
2,866,279
READING AND WRITING DEVICE FOR THE BLIND
Filed June 29, 1956
3 Sheets-Sheet 1
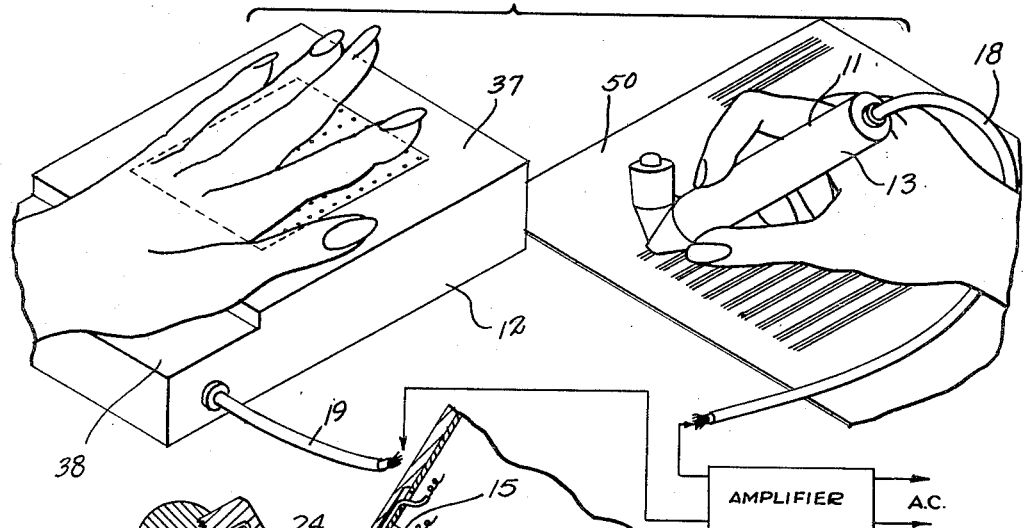
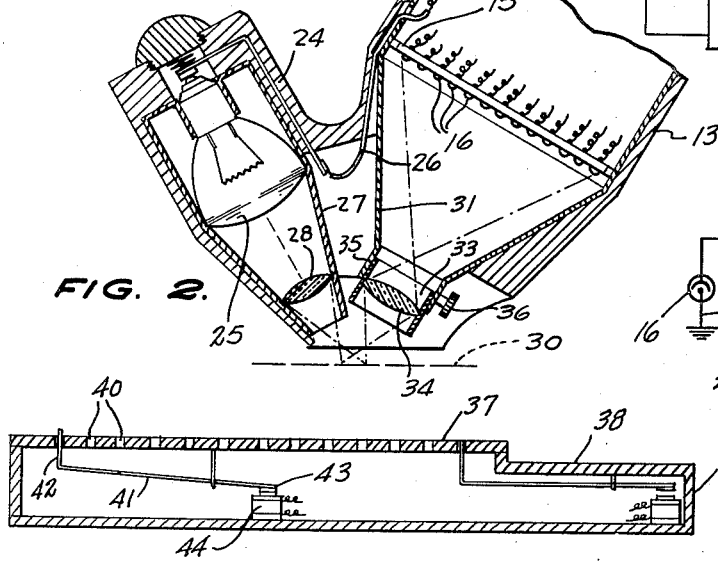
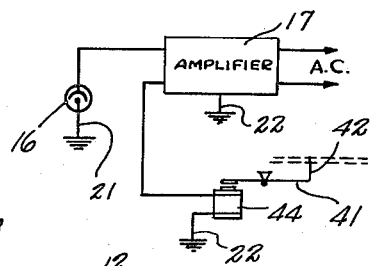
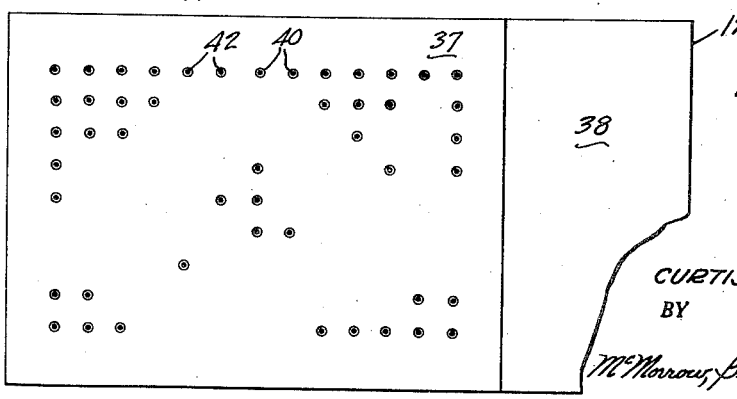
INVENTOR.
CURTIS M. SURBER,
BY
McMorrow, Berman + Davidson
ATTORNEYS.

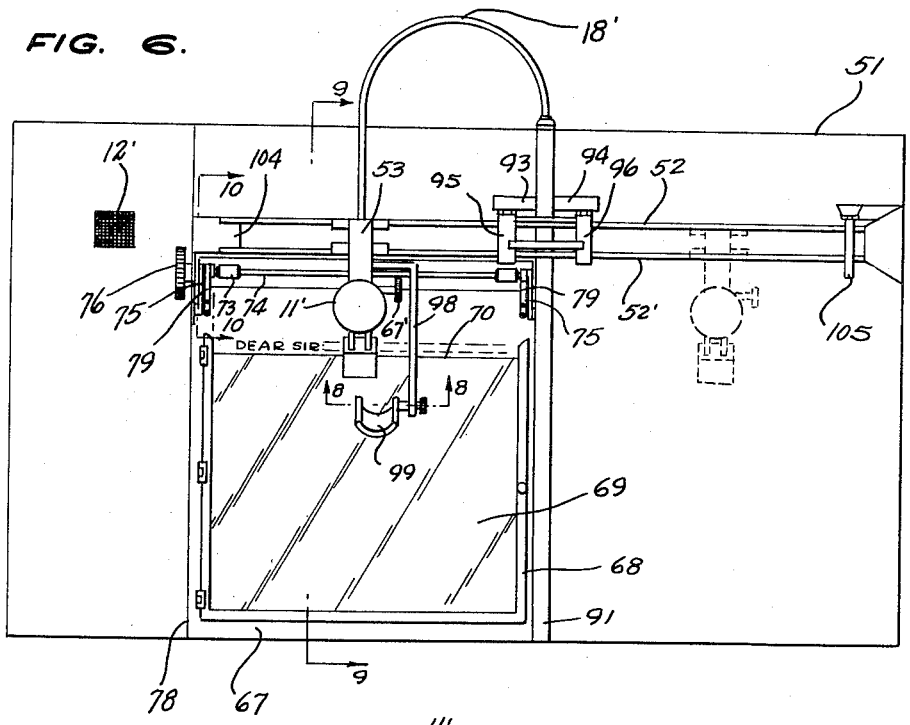
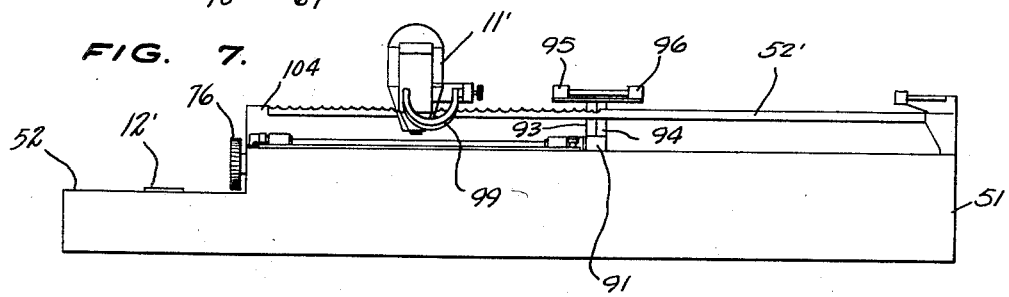
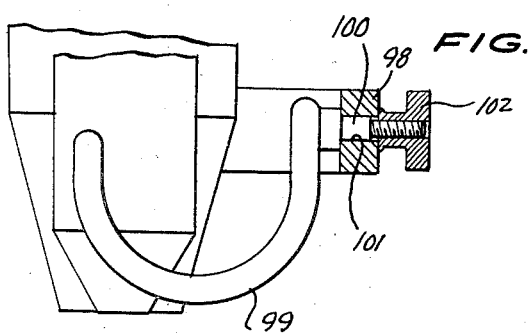

Dec. 30, 1958   C. M. SURBER   2,866,279
READING AND WRITING DEVICE FOR THE BLIND
Filed June 29, 1956   3 Sheets-Sheet 3
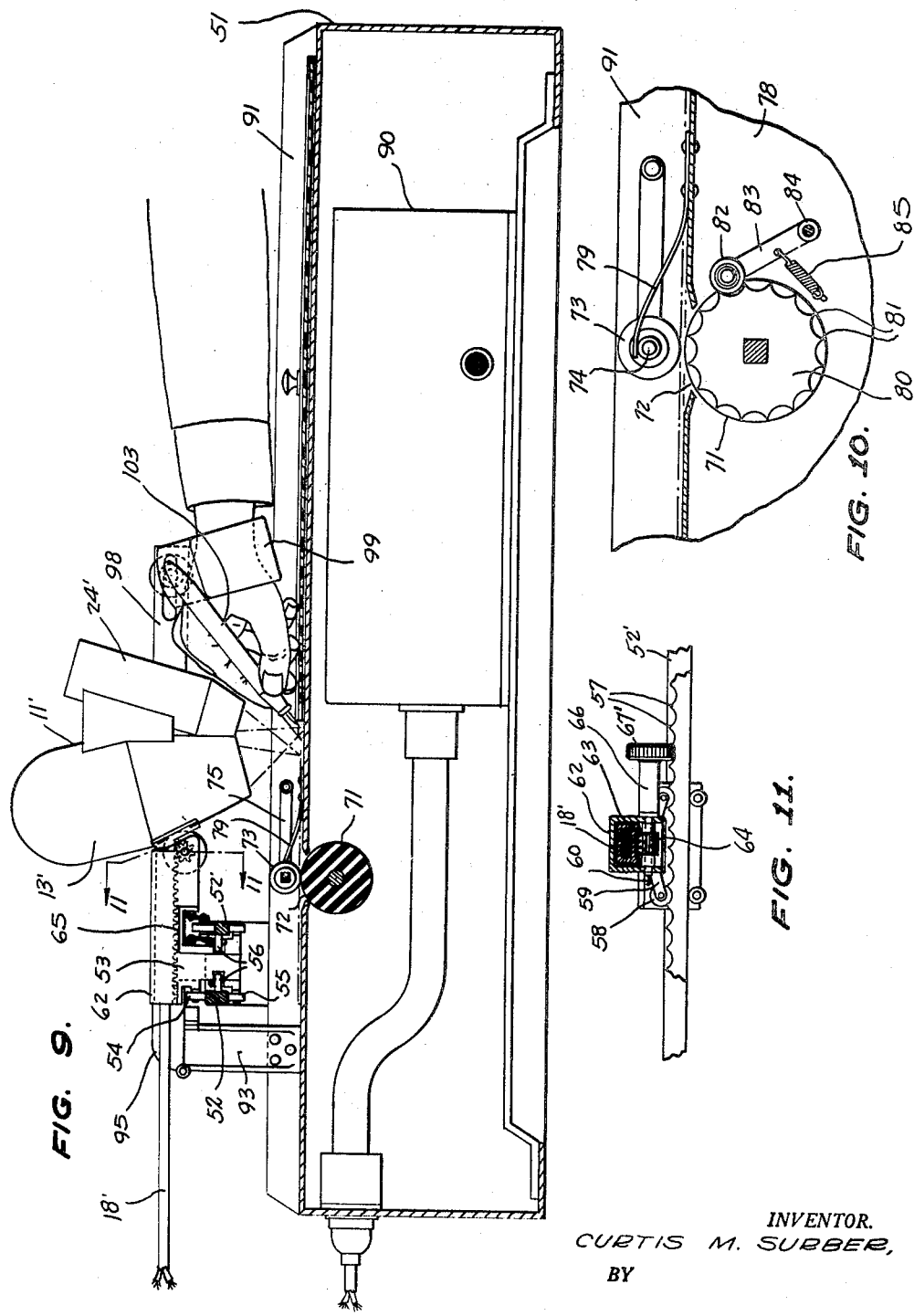
INVENTOR.
CURTIS M. SURBER,
BY
McMorrow, Berman & Davidson
ATTORNEYS.

United States Patent Office 2,866,279
Patented Dec. 30, 1958

2,866,279

READING AND WRITING DEVICE FOR THE BLIND

Curtis M. Surber, Wichita Falls, Tex.

Application June 29, 1956, Serial No. 594,830

3 Claims. (Cl. 35—35)

This invention relates to devices to enable blind persons to directly read printed type, written script or other symbols without requiring the use of Braille or similar techniques.

A main object of the invention is to provide a novel and improved electrical apparatus enabling a standard printed page, or any other written or printed material to be scanned and to cause said material to be reproduced in a manner enabling a blind person to tactually read the scanned material, the device being simple in construction, being compact in size, and providing accurate reproduction of any written, printed, or similar material with which it is employed.

A further object of the invention is to provide an improved electro-mechanical reading device for the blind, said device involving inexpensive components, being reliable in operation, and being easy to manipulate, the device operating to reproduce material scanned by the receiver thereof in a mechanical form which may be easily sensed and interpreted by a blind person, the mechanical reproduction accurately reproducing the material being scanned by the receiver.

A still further object of the invention is to provide an improved reading and writing device for the blind which enables a blind person to mechanically sense the symbols which he writes as they are written and which accurately guides the writer's hand, enabling a blind person to write in the same manner as any normal individual and enabling said person to read the written material, as well as to read any other material at a rate of speed comparable to a person with normal eyesight.

Further objects and advantages of the invention will become apparent from the following description and claims, and from the accompanying drawings, wherein:

Figure 1 is a perspective view showing one form of reading and writing device according to the present invention, the electrical portions of the device being symbolically represented in block form and only with respect to one of the amplifier channels employed in the device.

Figure 2 is an enlarged vertical cross sectional view taken through the lower portion of the character scanning member employed in the system illustrated in Figure 1.

Figure 3 is a partial vertical cross sectional view taken through the image reproducer employed in the system of Figure 1.

Figure 4 is a partial fragmentary top plan view of the image reproducer employed in the system of Figure 1.

Figure 5 is a block diagram showing the electrical circuit associated with one of the photosensitive elements and its corresponding electromagnetic plunger actuator, as employed in the system of Figure 1.

Figure 6 is a top plan view of a modification of the system of the present invention, wherein the receiver is guided in its movement and wherein feed means is provided for the tablet, as well as means for guiding the hand of a blind person along the tablet so that such a person may write on the tablet and may read the written material, as well as other material which he may wish to place on the device.

Figure 7 is a front elevational view of the reading and writing device shown in Figure 6.

Figure 8 is an enlarged vertical cross sectional detail view taken on the line 8—8 of Figure 6.

Figure 9 is an enlarged vertical cross sectional view taken on the line 9—9 of Figure 6.

Figure 10 is an enlarged vertical cross sectional detail view taken on the line 10—10 of Figure 6.

Figure 11 is an enlarged cross sectional detail view taken on the line 11—11 of Figure 9.

Referring to the drawings, and more particularly to Figures 1 to 5, one form of reading and writing device for the blind is illustrated, comprising a character scanning member 11 and an image reproducer 12 electrically connected to the character scanning member 11 and being formed and arranged to reproduce images scanned by the member 11 in a manner presently to be described.

The character scanning member 11 comprises an elongated tubular housing 13 shaped so that it may be easily held in the hand, as illustrated in Figure 1, but nevertheless being of substantial diameter. Mounted in the lower portion of the elongated housing 13 is a receiver designated generally at 15, said receiver comprising a rigid supporting wall in which are mounted a plurality of evenly distributed photo-sensitive elements 16, which may be, for example, photo-transistors of the miniature germanium or cadmium-sulphide type. The photo-sensitive elements 16 may be distributed in any suitable pattern, for example, in spaced rows of evenly spaced elements, the spacings between the rows being the same as the spacing between the elements of the individual rows, whereby the receiver 15 is provided with a substantially rectangular mosaic or grid of such photo-sensitive elements, comprising 100 or more of such elements.

Respective amplifiers 17 are provided for the photosensitive elements 16, each photo-sensitive element 16 having a separate amplifier 17, the amplifiers being preferably of the transistor type so as to occupy minimum volume. The amplifiers are housed in a suitable container which is not mechanically connected to the character scanning member 11 except by a flexible cable 18 which contains the respective pairs of conductors electrically connecting the photo-sensitive elements 16 to their respective amplifiers 17.

A flexible cable 19 connects the output leads of the amplifiers to the image reproducer 12.

To minimize the number of conductors in the cables 18 and 19, respective photo-sensitive elements 16 may employ a common ground wire, contained in cable 18, and the respective amplifiers 17 may employ a common ground wire contained in the cable 19. The common ground wire for the photo-sensitive elements 16 is designated at 21 in Figure 5, and the common ground wire for the amplifiers 17 is designated at 22 therein.

As shown in Figure 2, the lower portion of the housing 11 tapers downwardly and has integrally secured thereto a lamp housing 24 extending at an acute angle to the axis of the main tubular housing 13. A lamp 25 is mounted in the lamp housing 24 and is energized from the power source, not shown, by the ground wire 21 and an energizing wire 26 contained in the cable 18. The power source may be the same power supply employed for the amplifiers 17 and may be mounted in the same container as said amplifiers.

The lamp housing 24 is provided with an inner, downwardly convergent light projection chamber 27 provided in its lower portion with a projection lens 28 arranged to project light from the lamp 25 downwardly along the axis of the lamp housing 24 and onto a surface 30 to be illuminated. The main housing 13 is provided with an interior housing portion 31 which surrounds the receiver 15 and which tapers downwardly therefrom, as is clearly shown in Figure 2, the lower end of the tapered portion of the inner housing 31 containing a cylindrical lens tube 33 in which is mounted a focusing lens 34 which is adjustable in the cylindrical lower portion of inner housing 31, shown at 35.

A clamping screw 36 is provided in the cylindrical portion 35 to secure the lens barrel 33 in longitudinally adjusted position along the axis of the main housing 13, whereby an illuminated image on the surface 30 will be focused on the receiver 15, and said image will be thus projected onto the mosaic or grid defined by the distributed photo-sensitive elements 16.

The image reproducer 12 comprises a generally rectangular housing having a top wall 37, the rear portion of said top wall being somewhat depressed, as shown at 38, so as to comfortably receive a person's hand with the palm thereof overlying the main portion of top wall 37, and with the major portions of the fingers of the hand engaged over the intermediate portion of the elevated main top wall section. The intermediate portion of the main elevated top wall section is provided with a plurality of perforations 40 distributed in the same manner as the photo-sensitive elements 16 of receiver 15, and thus defining a mosaic or grid-like pattern identical with the pattern of said photo-sensitive elements 16. Associated with each aperture 40 is a lever 41 pivoted internally in the housing of the image reproducer 12, and having a vertical portion 42 aligned with its associated aperture 40 and being vertically movable therethrough, as shown in Figure 3. The opposite end portion of each lever 41 has a magnetic element 43 secured thereto adjacent the core of a relay solenoid 44, whereby the vertical pin element 42 of each relay 41 projects upwardly through its aperture 40 for a substantial distance responsive to the energization of its associated relay solenoid 44. The pivot points of the levers 41 are so located that when the relays 44 are deenergized, the levers drop their pin elements 42 to positions substantially flush with the top surface of top wall 37. Obviously, if so desired, springs may be employed to bias the levers 41 to such positions, whereby the pin elements 42 will be retracted so that they are flush with the top surface of wall 37 when their associated relay solenoids 44 are deenergized.

Each relay solenoid 44 is connected in the output circuit of a corresponding amplifier 17, the photo-sensitive elements 16 being arranged to suitably control the amplifier output current so that the solenoid relays 44 are energized only when minimum light is received by the photo-sensitive elements 16 and become deenergized when light of substantial intensity is received by the photo-sensitive elements. Thus, the photo-sensitive elements 16 may be connected in a suitable circuit associated with the control elements of the amplifiers so as to render said amplifiers non-conducting responsive to high intensity of light received by the photo-sensitive elements and to restore conduction of the amplifiers when the intensity of the received light drops below a predetermined value. Therefore, when substantial light intensity is sensed by each photo-responsive element 16, its asociated amplifier decreases its output current, causing its associated relay solenoid 44 to become substantially deenergized, whereby its associated lever 41 is released, retracting the vertical pin 42 carried thereby. Conversely, when the incident illumination intensity on each photo-sensitive element 16 decreases below a predetermined level, its associated amplifier 17 becomes conducting and causes energization of the corresponding relay solenoid 44, whereby the associated image-forming pin element 42 thereof is elevated through its aperture 40.

Where vacuum tubes are employed as amplifiers 17, the photo-sensitive elements 16 may be connected in suitable circuits providing negative bias to cause the amplifier tubes to become non-conducting responsive to reception of light by the photo-sensitive element 16 beyond a predetermined intensity threshold, the photo-sensitive element 16 thus controlling the potential on the grids of the amplifier tubes in a well known manner to trigger the tubes into conduction when the incident illumination received by the photo-sensitive tubes decreases below the above mentioned threshold. Corresponding circuits may be employed where transistors are used as the amplifiers 17.

In using the apparatus to read printed or written characters, the person holds the character scanning member 11 in one hand in the manner illustrated in Figure 1 so that said member may be moved over the lines of written or printed characters, while at the same time the person places his other hand on the mechanical image reproducer 12 in the position illustrated. Thus, the person may employ his right hand to scan the written or printed characters while employing his left hand to sense the mechanical images formed by said characters by the cooperation of the receiver 15, the amplifier 17, the relay solenoids 44 and the levers 41. The receiver 15 has projected thereon the illuminated image of characters located in the field of the objective lens 34, said image inforation being projected onto the receiver 15 and impinging on the distributed photo-sensitive elements 16. The elements 16 cause their associated relay solenoids 44 to become energized inversely in accordance with the amount of illumination received by each of the individual photo-sensitive elements 16. As above explained, a dark spot in the projected image will leave its associated photo-sensitive element 16 deenergized, causing the corresponding relay solenoids 44 to become energized, whereby a vertical plunger element 42 will become elevated above the surface of the top wall 37 of image reproducer 12 in a position corresponding to the position of the aforesaid photo-sensitive element. Therefore, the elevated plunger elements 42 will substantially reproduce patterns corresponding to the dark portions of the illuminated information, in this case, written or printed characters, enabling a blind person to sense said characters with the hand resting on the image reproducer 12, as illustrated in Figure 1. Therefore, as will be readily apparent, a person may scan a page of written or printed material, for example, page 50 illustrated in Figure 1, and "read" the material on the page 50 by mechanically reproducing the written or printed material on the image reproducer 12 and sensing said material with his hand.

Referring now to the form of the invention shown in Figures 6 to 11, 51 designates a tablet support which may be mounted horizontally on a table, or the like, as illustrated. The tablet support 51 has a relatively depressed end portion 52 on which is mounted an image reproducer 12' substantially identical to the image reproducer 12, shown in Figures 1, 3 and 4, but preferably of much reduced size so that it may be engaged by a single finger of the hand rather than by the whole hand. Otherwise, the reproducer 12' comprises a perforated grid-like body provided with vertically movable pin elements actuated by relay solenoids, in the same manner as previously described.

Mounted on the tablet support 51 adjacent its upper margin, as viewed in Figure 6, are a pair of longitudinally extending, parallel guide tracks 52, 52' on which is slidably mounted a carriage 53, for example, by means of top and bottom rollers 54 and 55 provided on the carriage and inner rollers 56 provided on said carriage engaging the inside surfaces of the guide tracks 52, 52', as shown in Figure 9. The guide track 52' is provided with uniformly spaced serrations 57 in its top edge which are engaged by rollers 58 carried on pivoted arms 59 provided on carriage 53 and biased into contact with the trough between the serrations 57 by leaf springs 60 on said carriage, as shown in Figure 11, whereby the carriage may be moved through predetermined steps along the guide tracks 52, 52' because of the limiting action provided by the cooperation of rollers 58 with the serrations 57. These steps are arranged to correspond substantially to the average width of a written or printed character.

The carriage 53 comprises the generally channel-shaped main body 62 extending transverse to the tracks 52, 52' and supported thereon for longitudinal movement, as above described. Slidably mounted inside the channel element 62 is a rack bar 63 which is supported on a pinion gear 64 journaled transversely between the walls of the channel 62 at its forward end portion, the rear end portion of the rack bar 63 being supported on suitable bracket means provided transversely in the main body portion of the member 62. Thus, the intermediate portion of the rack bar 63 may be slidably supported on a downwardly facing channel member 65 containing the supporting arms for the rollers 58, as well as forming part of the support for the rollers 56 engaging the inside surface of the track bar 52', as shown in Figure 9.

The pinion gear 64 is provided with an external actuating shaft 66 having a knob 67, whereby the rack bar 63 may be adjusted longitudinally in the channel 62, providing a range of adjustment of said rack bar to compensate for variations in spacing between successive lines of written or printed material, or for variations in the vertical positioning of characters in written or printed material, as will be presently explained.

Mounted on the forward end of the rack bar 63 is a character scanning member 11' generally similar to the character scanning member 11 previously described and containing a light source in a sub-housing 24' adapted to project a beam of light downwardly onto a subjacent surface whereby an image illuminated by said beam will be reflected upwardly into the main housing, shown at 13' of the character scanning member 11' and will be projected onto a grid or mosaic of photo-sensitive element on a receiver similar to the receiver 15 shown in Figure 2.

Mounted on the elevated major portion of the top surface of tablet support 51 for example, at the left side thereof, as viewed in Figure 6, is a guide frame 67 adapted to receive a tablet, such as a piece of paper, or the like, said frame being provided with a hinged cover 68 having a transparent protective panel 69 adapted to clampingly engage the tablet or paper sheet and to yieldingly hold said paper sheet or tablet in the hinged cover 68, while allowing the sheet or tablet to be moved in the frame 67 transverse to the direction of the guide rails 52, 52'.

As shown in Figures 6 and 9, the transparent, flexible clamping member 69 terminates forwardly of the character scanning member 11', the tope edge of the transparent protective panel 69 being shown at 70 in Figure 6. Designated at 71 is a feed roller which is rotatably mounted subjacent to a clamping slot 72 formed in the top wall of tablet support 51 subjacent to and parallel to the guide rails 52, 52', being preferably spaced slightly forwardly of said guide rails, as shown in Figure 9, and projecting slightly through the slot 72. Cooperating gripping rollers 73 are slidably mounted on a supporting rod 74 carried on arms 75 pivoted to the tablet support 51 and being located substantially in the transverse vertical planes of the respective sides of the guide frame 67, whereby sufficient clearance is defined between the rods 75, 75 for a sheet of paper or other tablet to move therebetween in a direction transverse to the guide rails 52, 52', and beneath said guide rails, as will be apparent from Figure 9. The feed roller 71 is provided with an external actuating knob 76 which projects through the vertical offset wall portion 78 of the tablet support 51 adjacent to the depressed top wall portion 52, and adjacent to the mechanical image reproducer 12', as shown in Figure 6. Leaf springs 79 engage the end portions of guide shaft 74 adjacent the arms 75 and bias said shaft 74 downwardly to urge rollers 73 against the feed roller 71, whereby a sheet of paper or other flexible tablet member will be clamped between the guide rollers 73 and the feed roller 71 and will be moved responsive to rotation of said feed roller.

As shown in Figure 10, a disc member 80 having a serrated periphery is provided on the roller 71 at one end thereof, the serrations of said periphery being shown at 81, and said periphery being engaged by a roller 82 carried on an arm 83 pivoted at 84 to the wall 78 and being biased into engagement with the serrated periphery of the disc 80 by a coiled spring 85 connecting the intermediate portion of arm 83 to the subjacent portion of wall 78, as is clearly shown in Figure 10. The serrations 81 are spaced apart to provide predetermined steps of feed of the paper or other flexible tablet engaged between the feed roller 71 and the roller 73, responsive to rotation of the feed knob 76, the spacings between the successive steps corresponding to a desired spacing between successive lines of written or printed characters, but the position of the character sensing member 13' being nevertheless variable, to compensate for variations in spacing, when the device is employed for reading, by means of the position-adjusting knob 67, as above explained.

The amplifiers associated with the character sensing member 13' and with the relay solenoids associated with the image reproducer 12' are contained in a housing 90 mounted within the tablet support 51, as shown in Figure 9, the character sensing member being electrically connected to the amplifiers in housing 90 by the flexible cable 18', containing the wires interconnecting the photosensitive elements with their associated amplifiers.

As shown in Figures 6 and 9, a transversely extending, upstanding rib 91 is provided on the top surface of the tablet support 51, said rib extending beneath the longitudinal guide tracks 52, 52'.

As shown in Figure 6, the guide tracks 52, 52' are substantially coextensive in length with the elevated main portion of the top wall of tablet support 51, and the rib 91 extends below the intermediate portions of the respective guide tracks 52, 52' perpendicular thereto. Respective upstanding bracket members 93 and 94 are secured to opposite sides of the rib 91 adjacent the upper margin thereof, as viewed in Figure 6, and hinged to the top portions of the upstanding bracket members 93 and 94 are respective stop bars 95 and 96 which may be employed to limit the movement of the carriage 53 to either an area on the left side of the rib 91, by the use of a stop bar 95, or to an area on the right side of said rib 91, as shown in dotted view in Figure 6, by the use of the stop bar 96. To move the carriage 53 from the left side of rib 91 to the right side thereof, as viewed in Figure 6, it is merely necessary to elevate both of the stop bars 95, 96, whereby the carriage 53 may be moved to the right to the dotted line position thereof, shown in Figure 6, without obstruction by the stop bars, after which the stop bar 96 may be lowered to a position overlying the guide tracks 52, 52', whereby the carriage 53 will then be limited as it moves to the left by the engagement thereof with stop bar 96. Similarly, when the carriage 53 is in the position shown in full line view in Figure 6, movement of the carriage to the right will be limited by the engagement thereof with the stop bar 95.

Rigidly secured to the main channel 62 of carriage 53 and extending a substantial distance forwardly of the character sensing member 11' is a bracket arm 98 to the forward end of which is adjustably secured a U-shaped hand supporting member 99. As shown, said supporting member 99 is provided with a shank 100 which extends through an aperture 101 in the forward end of bracket arm 98 and has threadedly engaged thereon a clamping nut 102 which, when tightened, locks the U-shaped hand support 99 in a desired position of angular adjustment with respect to the character sensing member 11'.

As shown in Figure 9, the support 99 holds the hand of a person writing on the tablet support 51 in proper position so that the characters formed by the pen 103, or other writing implement employed, will be scanned by the character sensing member 11', and the characters will be mechanically reproduced on the image reproducer 12' in the manner previously described, so that the person may sense the characters with a finger tip of his other hand while forming the characters with the pin 103 or other implement in the manner illustrated in Figure 9. After each character is formed, the carriage 53 may be advanced to form the next character by moving said carriage one step along the guide rails 52, 52'. The carriage engages the stop bar 95 when the end of a line is reached, whereupon the carriage may be returned to the left, by moving same until it engages a limiting stop member 104 provided at the left ends of the guide rails 52, 52', as viewed in Figure 6, and the tablet may be advanced to a position to form the next line by rotating the feedknob 76 through one step.

A fixed stop bar 105 is provided on the right end of the tablet support 51 across the guide rails 52, 52', limiting movement to the right of the character sensing member 11' when said character-sensing member is positioned at the right side of the dividing rib 91, as is clearly shown in Figure 6.

On completion of the writing operation, the stop arms 95 and 96 may be elevated, said stop arms being preferably rigidly connected together so that they are simultaneously actuated, so that the carriage 53 may be moved to the right side of the tablet support 51, as above explained. The serrations 57 in rail 52' may be omitted, if so desired, at the right side of the rib 91, whereby the carriage 53 may be freely moved longitudinally on the rails 52, 52' when in the reading position, namely, at said right side of rib 91. The written tablet, or other material to be read, is placed on the tablet support 51 at the right side of rib 91 in position to be scanned by the character sensing member 11', following the procedure previously described in connection with the form of the invention shown in Figures 1 to 5, except that in the form illustrated in Figures 6 to 11, the character sensing member is mechanically supported and may be adjusted transverse to the rails 52, 52', as desired, by means of the rack gear knob 67.

The rack gear knob 67 preferably provides a range of adjustment up to approximately 1 inch of movement of the character sensing member 11' in a direction transverse to the guide rails 52, 52', any further transverse movement or adjustment being provided by moving the tablet or paper sheet manually in a direction transverse to said guide rails, or by employing the paper feed means comprising the feed roller 71 and the cooperating rollers 73 in association with the tablet guide frame 67.

It will be understood that advancement of the carriage 53 is accomplished by applying sufficient force on the hand support 99 to move the carriage to the next step against the restraining force of the leaf spring 60 which acts on the arm 59 and which urge the rollers 58 into engagement with the trough between the successive serrations 57 on the guide rails 52'.

It will be further understood that transverse movement of the tablet, for example, when the end of a line is reached, is accomplished by rotating the feed knob 76 to move the paper one step in the direction transverse to the guide rails 52, 52', namely, toward the upper edge of the tablet support 51, as viewed in Figure 6.

While certain specific embodiments of an improved reading and writing device for the blind have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a reading and writing device for the blind, a tablet support, means to position a tablet horizontally on said support, guide tracks rigidly mounted on the support extending transverse to said tablet positioning means, paper feed means on said support formed and arranged to feed a tablet horizontally on said tablet support in predetermined steps transverse to said guide tracks, a character-sensing member movably mounted on said guide tracks, said sensing member comprising a housing, a light source in said housing, a receiver comprising a plurality of distributed photo-sensitive elements mounted in said housing, means to direct images beneath the housing illuminated by said light source onto said receiver, whereby to energize said photo-sensitive elements in accordance with said images, an image reproducer mounted on said support in side-by-side relation to said tablet positioning means, said reproducer comprising an auxiliary support, a plurality of vertical plungers movably mounted on said auxiliary support and distributed in correspondence with said photo-sensitive elements, respective electromagnetic actuators operatively associated with the plungers, means to energize the actuators in accordance with the energization of the photo-sensitive elements, whereby to substantially reproduce the images at the reproducer by the movement of said plungers, means to move said sensing member in predetermined steps along said guide means, and a hand-supporting bracket member connected to said character-sensing member and extending forwardly thereof.

2. In a reading and writing device for the blind, a tablet support, means to position a tablet horizontally on said support, guide tracks rigidly mounted on the support extending transverse to said tablet positioning means, paper feed means on said support formed and arranged to feed a tablet horizontally on said tablet support in predetermined steps transverse to said guide tracks, a carriage support movably mounted on said guide tracks, a character-sensing member on said carriage support, means to adjust said character-sensing member relative to said carriage support in a direction perpendicular to said guide tracks, said sensing member comprising a housing, a light source in said housing, a receiver comprising a plurality of distributed photo-sensitive elements mounted in said housing, means to direct images beneath the housing illuminated by said light source onto said receiver, whereby to energize said photo-sensitive elements in accordance with said images, an image reproducer mounted on said support in side-by-side relation to said tablet positioning means, said reproducer comprising an auxiliary support, a plurality of vertical plungers movably mounted on said auxiliary support and distributed in correspondence with said photo-sensitive elements, respective electromagnetic actuators operatively associated with the plungers, means to energize the actuators in accordance with the energization of the photo-sensitive elements, whereby to substantially reproduce the images at the reproducer by the movement of said plungers, and means to move said carriage support in predetermined steps along said guide tracks.

3. In a reading and writing device for the blind, a tablet support, means to position a tablet horizontally on said support, guide tracks rigidly mounted on the support extending transverse to said tablet positioning means, paper feed means on said support formed and arranged to feed a tablet horizontally on said tablet support in predetermined steps transverse to said guide tracks, a carriage support movably mounted on said guide tracks, a character-sensing member on said carriage support, means to adjust said character-sensing member relative to said carriage support in a direction perpendicular to said guide tracks, said sensing member comprising a housing, a light source in said housing, a receiver comprising a plurality of distributed photo-sensitive elements mounted in said housing, means to direct images beneath the housing illuminated by said light source onto said receiver, whereby to energize said photo-sensitive elements in accordance with said images, an image reproducer mounted on said support in side-by-side relation to said tablet positioning means, said reproducer comprising an auxiliary support, a plurality of vertical plungers movably mounted on said auxiliary support and distributed in correspondence with said photo-sensitive elements, respective electromagnetic actuators operatively associated with the plungers, means to energize the actuators in accordance with the energization of the photo-sensitive elements, whereby to substantially reproduce the images at the reproducer by the movement of said plungers, and means to move said carriage support in predetermined steps along said guide tracks, and a hand-supporting bracket member rigidly connected to the character-sensing member and extending forwardly thereof.

References Cited in the file of this patent

UNITED STATES PATENTS

| | | | |
|---|---|---|---|
| 1,487,115 | McQuarrie | Mar. 18, | 1924 |
| 1,889,576 | Snook | Nov. 29, | 1932 |
| 1,921,000 | Naumberg | Aug. 8, | 1933 |
| 2,035,773 | Thomas | Mar. 31, | 1936 |
| 2,327,222 | Sell | Aug. 17, | 1943 |
| 2,420,716 | Morton | May 20, | 1947 |

FOREIGN PATENTS

| | | | |
|---|---|---|---|
| 87,502 | Austria | Mar. 10, | 1922 |
| 242,291 | Great Britain | Mar. 4, | 1926 |